United States Patent [19]

Tepedino

[11] 4,016,654

[45] Apr. 12, 1977

[54] RANGE FINDER

[75] Inventor: Patrick Tepedino, Port Jefferson Station, N.Y.

[73] Assignee: Lawrence Peska Associates, Inc., New York, N.Y. ; a part interest

[22] Filed: Jan. 26, 1976

[21] Appl. No.: 652,208

[52] U.S. Cl. .................................................. 33/277
[51] Int. Cl.² ........................................ G01C 3/24
[58] Field of Search ................... 356/11, 21, 3, 22; 33/276, 277, 278, 297–298, 299; 350/10

[56] References Cited

UNITED STATES PATENTS

| 53,420 | 3/1966 | Daly | 33/277 |
|---|---|---|---|
| 3,381,381 | 5/1968 | Ruchlis | 33/277 |
| 3,842,511 | 10/1974 | Young | 33/277 |
| 3,846,918 | 11/1974 | Wehlau | 33/277 |

FOREIGN PATENTS OR APPLICATIONS

| 3,729 | 1881 | United Kingdom | 33/277 |

Primary Examiner—Harry N. Haroian

[57] ABSTRACT

A range finder is disclosed comprising a tube having an eye opening, an object opening and a sight divided into sections, each section having a sight line or a plurality of sight lines with designated ranges next to each sight line. This arrangement of sight lines allows for the placement of a plurality of easily readable ranges on a relatively small sight. The clustering of sight lines one on top of the other the full height of the sight makes it difficult to use a range finder without some eye strain. The arrangement of sight lines disclosed in the present invention obviates this problem but still allows for the placement of a sufficient number of sight lines so that the range finder is effective over a wide range of distances.

2 Claims, 3 Drawing Figures

RANGE FINDER

SUMMARY OF THE INVENTION

The present invention relates to a range finder comprising a tube having an eye and an object end both ends of the tube being open for visual sighting therethrough. A sight is mounted in the object end of the tube, the sight comprising a plurality of base lines transverse to the longitudinal axis of the tube a fixed distance from the eye opening, each base line positioned at an angle to one another dividing the sight into a plurality of sections. Each base line has a plurality of sight lines parallel to and extending above it. Readable indicia for designating the range of an object are positioned adjacent the sight lines, each of the sight lines in each section representing a different range. The indicia are parallel to and readable with respect to the base line subtending the section in which the indicia are positioned. The sight lines are spaced above the base line by a factor based on the tangent of an object being sighted and the distance of such object to the eye opening where the tube has no optical magnification lenses, the factor is multiplied by the distance of the eye opening to the sight. The tube is rotatable on its longitudinal axis for aligning the sight lines and indicia of each section with a distant object so that the object may be sighted through one base line and sight line and the indicia adjacent the sight line read.

In one embodiment the base lines intersect at the longitudinal axis of the tube. Additionally, the tube may comprise a round tube.

In another embodiment, the eye end of the tube and the object end of the tube have an optical lens system e.g. an eye lens and object end has an object end for magnifying objects over a distance.

DETAILED DESCRIPTION

Range finding devices are disclosed in U.S. Pat. Nos. 3,824,698 Brucker; 3,846,918 Wehlau; 3,409,987 New; 3,381,381 Ruchlis; 3,031,764 Larson; 2,724,898 Douglass; 2,189,964 Sealey; and 613,566 Farrand.

The prior art range finders are usually constructed in the form of a telescope or an elongated tube having an eye opening on one end and an object opening on the other end having a plurality of sight lines which may be referenced to a base line. The distance between the eye opening and the sight lines is fixed. When the object to be sighted has been positioned between the appropriate base line and sight line, the distance of the object is determined if its height or length is known and the ratio of the height of the sight line from the base line with respect to the distance between the eye opening and object opening is known.

A plurality of sight lines are employed for reference to a base line, each sight line corresponding to a different range of an object from the eye opening or eye piece of the range finder. A more versatile range finder would have a great number of these sight lines so that the range finder would be effective over a broad range. Range finders of this type become more difficult to use as the number or sight lines increase since a large number of sight lines tend to confuse the person using the device and also cause a certain amount of eye strain.

It is therefore, an object of the present invention to overcome these and other difficulties encountered in the prior art.

It is another object of the present invention to provide a range finder that has a base line and a plurality of sight lines arranged in a fashion so that a person using the range finder would be able to avoid eye strain.

It is a further object of the present invention to provide a range finder having a plurality of sight lines arranged in a novel and easy-to-use manner.

These and other objects have been achieved by the present invention and will become apparent by reference to the disclosure and claims that follow as well as the appended drawing.

Figure 1:
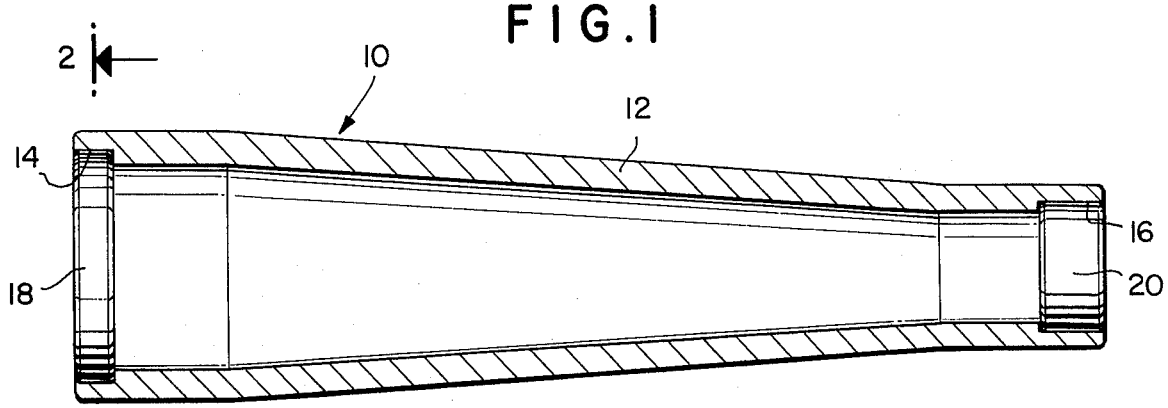
FIG. 1 is a side elevation in section illustrating a range finder having an eye end and an object end both ends being open and in the embodiment illustrated, lenses such as magnification lenses being provided at both ends according to one embodiment of the present invention.
Figure 2:
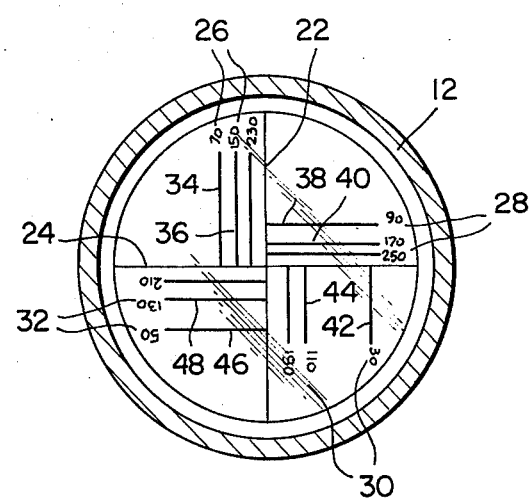
FIG. 2 is a front elevation of a sight in the object end of a range finder taken along the line 2—2 of FIG. 1 illustrating the various sections into which the sight is broken, the various sight lines in each section corresponding to a different range according to one embodiment of the present invention.
Figure 3:
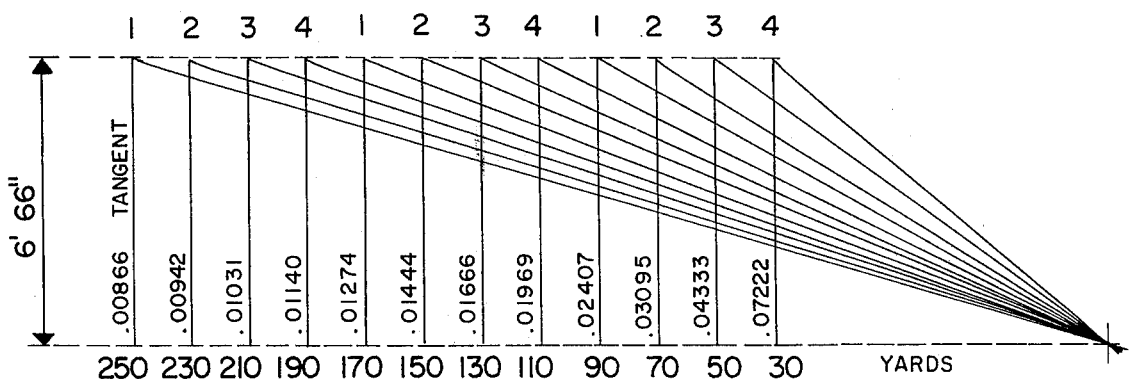
FIG. 3 comprises a scale of the tangents of a six foot six inch object over a range of from 30 yards to 250 yards from the object end of the range finder according to another embodiment of the present invention.

Referring to the drawing, and FIGS. 1 – 3, a range finder 10 is illustrated comprising a tube 12 having an eye end 16 and an object end 14, a glass or lens 20 being provided in the eye end and a glass or lens 18 being provided in the object end. A sight member comprising inscriptions on a transparent disc 18 is mounted in the object end 14 of tube 12, the sight comprising a plurality of base lines 22 and 24 transverse to the longitudinal axis of tube 12 and set a fixed distance from the eye opening 16 or glass 20. Each base line 22 and 24 is positioned at an angle to one another dividing the sight into a plurality of sections such as the quadrants illustrated in FIG. 2, each base line 22 and 24 having a plurality of sight lines such as sight lines 34, 36, 38, 40, 42, 44, 46, 48 parallel to and extending above the base lines. Readable indicia such as numerical range indicators 26, 28, 30 and 32 for designating the range of an object are positioned adjacent to the sight lines, so that each of the sight lines in the sections or quadrants illustrated in FIG. 2 represent a different range. The indicia are parallel and readable with respect to the base lines subtending the section in which they are positioned, such as for example indicia 28 are parallel to base line 24 and are arranged so that when the tube 12 is rotated on its longitudinal axis for 180 degrees, indicia 32 also parallel and readable with respect to base line 24. The sight lines 34, 36, 38, 40, 42, 44, 46 and 48 are spaced respectively above the base line by a factor directly proportional to the tangent of an object being sighted and the distance of such object to the eye opening 16. This factor is employed either in a range finder having a clear or transparent covers 18 and 20 at the object end and eye ends respectively or where members 18 and 20 at the object end and eye ends respectively or where members 18 and 20 comprise lenses for magnification of an object. When members 18 and 20 are non-magnifying transparent covers over the object opening 14 and eye opening 16 respectively of tube 12, the sight lines are spaced above the base line by a factor comprising the tangent of an object being sighted and the distance of such object to the eye opening 16 multiplied by the distance of the eye opening 16 to the sight 18. By the arrangement of the sight 18 illustrated in FIG. 2, in which the base lines 22 ad 24 intersect at the longitudinal axis of tube 12 so that the sight 18 is divided into 4 equal quadrants, a plurality of sight lines 34 – 48 inclusive are easily arranged over the full area of the sight so that the range of an object may be easily determined and the indicia 26, 28, 30 and 32 easily read without eye strain or confusion. The sight lines 34 – 48 inclusive are positioned respectively above base lines 22 and 24 so that the height of such sight lines above such base lines corresponds to the tangent of an object such as an object 6 feet 6 inches in height or in length any one of a plurality of fixed distances from 30 yards to 250 yards from the eye opening 16 according to one embodiment of the invention. This correspondence will be directly proportional to the length of the longitudinal axis between sight 18 and eye piece 20 where eye piece 20 and sight 18 are not magnification lenses. By way of example, if this length is 10 inches and the tangent of a right triangle having an altitude of 6 feet 6 inches and a length of 30 yards is 0.07222, the height of a sight line such as sight line 42 from base line 22 would be 0.7222 inches and any object 6 feet 6 inches in height that fit exactly between base line 22 and sight line 42 would be 30 yards from the eye piece 20.

Although the invention has been described by reference to some embodiments, it is not intended that the novel range finder be limited thereby but that some modifications thereof are intended to be included as falling within the broad scope and spirit of the foregoing disclosure, the following claims and the appended drawing.

What is claimed is:

1. A range finder comprising a tube having an eye end and an object end, both ends of said tube being open for visual sighting therethrough, sight means mounted in the object end of said tube, said sight means comprising a plurality of base lines transverse to the longitudinal axis of said tube a fixed distance from said eye opeing, each base line also intersecting one another, thereby dividing said sight means into sections, each section having a plurality of sight lines parallel to and extending above their respective base lines, readable indicia for designating the range of an object adjacent said sight lines each of said sight lines in each of said sections representing a different range, said indicia being parallel and readable with respect to the base line subtending the section in which said indicia are positioned, said sight lines being spaced above said base line by a factor comprising the tangent of an object of known dimension being sighted and the distance of such object to said eye opening, each sight line in each section being spaced a different distance from each other and from their respective base lines said parallel sight lines being arranged in each section so that said sight lines indicating relatively short distances are mixed with the sight line indicating longer distances to thereby avoid crowding of said sight lines and confusion of said indicia adjacent said sight lines, said tube being rotatable on its longitudinal axis for aligning the sight lines and indicia of each section with a distant object so that said object may be sighted through one base line and sight line and the indicia adjacent such sight line read.

2. The range finder of claim 1 where said base lines intersect at the longitudinal axis of said tube.

* * * * *